United States Patent [19]

Glickenberger

[11] Patent Number: 5,036,586
[45] Date of Patent: Aug. 6, 1991

[54] METHOD OF MOUNTING A REAR DECK FILLER PANEL ON A VEHICLE

[75] Inventor: Joseph E. Glickenberger, Rockford, Ill.

[73] Assignee: Chrysler Corporation, Highland Park, Mich.

[21] Appl. No.: 641,964

[22] Filed: Jan. 16, 1991

[51] Int. Cl.$^5$ .............................................. B23P 17/00
[52] U.S. Cl. ................................ 29/897.2; 29/897.3; 296/192; 296/194; 296/195
[58] Field of Search ................ 29/897.2, 897.3, 525.1; 52/126.6, 126.7; 296/192, 194, 195, 185

[56] References Cited

U.S. PATENT DOCUMENTS

| | | | |
|---|---|---|---|
| 3,222,030 | 12/1965 | Thorpe | 52/126.6 X |
| 4,466,654 | 8/1984 | Abe | 296/194 X |
| 4,521,050 | 6/1985 | Rea et al. | 296/194 X |
| 4,850,639 | 7/1989 | Gorski | 296/195 |
| 4,858,987 | 8/1989 | Gorski | 296/195 |
| 4,861,098 | 8/1989 | Gorski | 296/195 |
| 4,876,834 | 10/1989 | Domigan | 52/126.6 X |

FOREIGN PATENT DOCUMENTS 0014576 1/1984 Japan .................................. 296/192

Primary Examiner—Timothy V. Eley
Assistant Examiner—C. Richard Martin
Attorney, Agent, or Firm—Edward A. Craig

[57] ABSTRACT

A method of mounting a rear deck filler panel on a vehicle is provided. The method includes use of an adjustable support member including a base element and a panel support element which are threadingly connected to each other. The adjustable support member is placed in an upright position in a trough of the vehicle with the base element adhered in place and with the panel support element closely adjacent to a flange structure. The panel support element has a straight edge which impinges against the flange structure to prevent rotation after mounting of the adjustable support member. However, the adjustable support member is then tilted away from the flange structure to permit turning of the panel support element for adjustment of the height of the adjustable support member as necessary to properly position the rear deck filler panel with respect to adjacent vehicle structure.

2 Claims, 2 Drawing Sheets

METHOD OF MOUNTING A REAR DECK FILLER PANEL ON A VEHICLE

BACKGROUND OF THE INVENTION

1. Field of the Invention

A method of mounting a rear deck filler panel on a vehicle is provided. The method involves the use of adjustable support members which include a rotating threaded portion for adjustment which is locked against rotation after the adjustment has been accomplished.

2. Prior Art

Conventionally, a vehicle rear deck filler panel is used as an exterior body panel on a sedan-like car or similar vehicle. This panel is positioned between the rear vehicle window and the forward edge of the deck or trunk lid. It is necessary that the upper surface of the filler panel be in registry with the adjacent surfaces of the vehicle structure so that these elements will present a continuous surface appearance. If the exterior surface of the filler panel is higher or lower than the adjacent surfaces, an objectionable discontinuous surface appearance results.

Various techniques have been utilized for mounting rear deck filler panels. In one current technique, a bumper having fixed dimensions is provided for supporting the filler panel. The problem with using such an element is that the vehicle build is of such a nature that some dimensions cannot be held to close tolerances. The fixed dimensioned bumpers are mounted on the top surface of a support shelf which is defined by the upper deck drain. There is dimensional inconsistency between the upper deck drain and the upper edges of the trough in which the filler panel is mounted. The filler panel should be flush with these edges. The dimensional inconsistency may be as much as ⅜ of an inch. When bumpers of fixed size are used, this dimensional inconsistency sometime results in the filler panel being misaligned.

In accordance with the present invention, an adjustable support element is used in place of fixed size bumpers. The adjustable support element is adhered to the upper deck drain which forms part of a trough in which the filler panel is received. The upper portion of the adjustable support element can be adjusted to be flush with the upper edges of the trough. It is provided with a slick film on its top so that the filler panel will easily slide into position. The adjustable support element is also less expensive than previously used bumpers resulting in a saving in part costs. A further advantageous feature of this construction is that it minimizes noises such as buzz, squeak and rattle. The slick surface also prevents stress on the adhered lower portion of the support element thus adding life to the product.

The adjustable support element is mounted by a technique which results in the upper portion thereof being closely adjacent to an upright flange which is provided at each end of the aperture trough. The upper portion of the support is made with straight edges, preferably as a square element. One edge of the upper portion of the adjustable support element abuts against an upright flange and prevents any rotation after installation. This abutting relationship is made possible by the ability to tilt the adjustable support after it has been adhered in place to permit adjusting it to the proper size after it has been adhered to the support shelf. After it has been adjusted, it is tilted back into abutting relationship with the flange, thus resulting in the desired rotation preventing positionment.

SUMMARY OF THE INVENTION

A method of mounting a rear deck filler panel on a vehicle is provided. The panel is mounted in a trough provided between the rear window and the trunk lid opening and extends across the width of the vehicle between the vehicle quarter panels. The trough includes a bottom wall and upright flanges at each transverse end thereof. The junctures of the upright flanges with the vehicle quarter panels define upper end edges of the trough.

The rear deck lid filler panel is generally U-shaped in transverse cross-section and includes an elongated upper panel portion for extending between the quarter panels with a flange extending downwardly along each elongated side edge of the upper panel portion.

The method includes the steps of first providing an adjustable support member including a base element and a panel support element with one of the base element and the panel support element having a threaded opening and the other of these elements having a threaded member extending therefrom into threaded engagement with the threaded opening. The base element has a layer of adhesive on the underside thereof. The periphery of the panel support element is defined by an interconnected series of straight edges.

An adjustable support member is placed in an upright position in the trough closely adjacent to one of the upright flanges of the trough with the base element in adherent contact with the trough bottom wall and one of the straight edges of the panel support element located close enough to the adjacent upright flange to impinge thereon upon attempted rotation of the panel support element to thereby prevent such rotation. The height of the adjustable support member is then compared with the height of the adjacent upper end edge of the trough. The amount of the difference therebetween, if any, is noted.

The adjustable support member is then tilted away from the adjacent upright flange by applying sufficient manual force to overcome the adhesive contact of the base element with the trough bottom wall. The adjustable support member is tilted a distance sufficient to permit rotation of the panel support element. Preferably, the adjustable support elements are tilted about fifteen to twenty degrees away from the upright flanges to facilitate rotating of the panel support elements. The panel support element is then rotated to cause threading of the threaded member into or out of the threaded opening as necessary to adjust the height of the panel support element so that the upper surface of the panel support element will be substantially flush with the adjacent upper end edge of the trough.

The adjustable support member is then returned to its upright position. The above steps are then repeated with a second adjustable support member placed adjacent to the other upright flange.

Finally, the rear deck filler panel is placed in the trough with the elongated upper panel portion resting on the panel support elements of the adjustable support members.

IN THE DRAWINGS

DETAILED DESCRIPTION OF A PREFERRED EMBODIMENT

Figure 1:
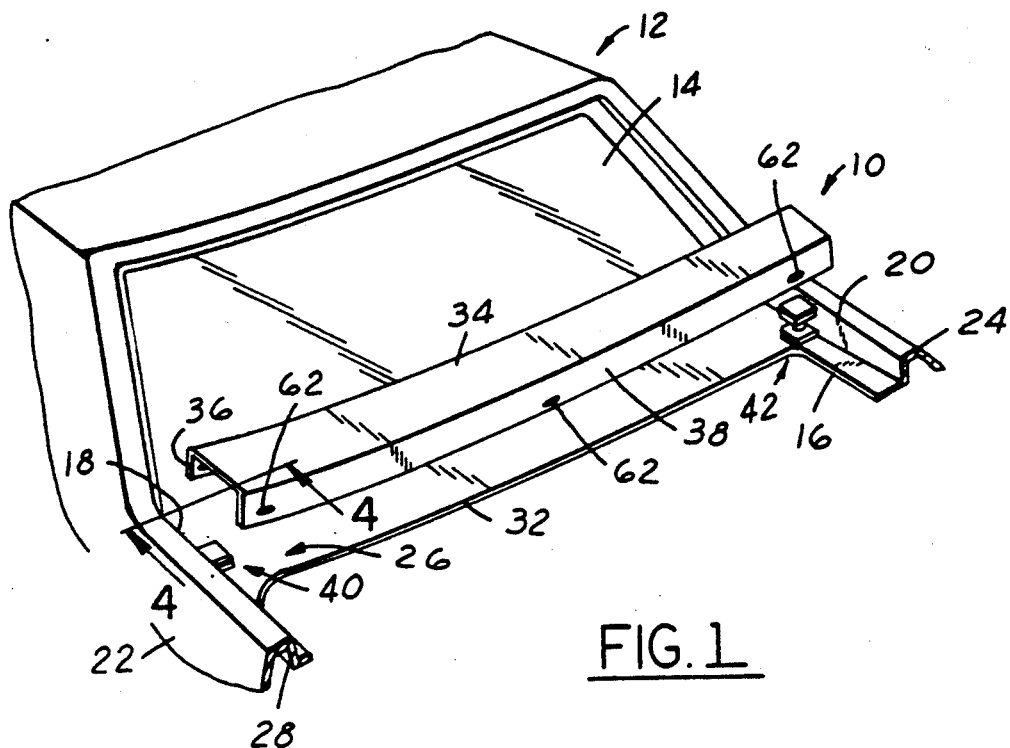
FIG. 1 is a perspective view of the rear portion of an automobile illustrating the mounting structure assembly for mounting a vehicle rear deck filler panel in accordance with one embodiment of the present invention.

Referring to FIG. 1, it will be noted that a vehicle rear deck filler panel 10 is positioned for mounting onto a vehicle 12, the vehicle being of the sedan type and including a rear window 14. A relatively large aperture 16 is provided rearwardly of the window 14. The aperture 16 is ultimately enclosed, primarily by the rear deck filler panel 10 and the vehicle deck or trunk lid.

A trough 26 is provided at the forward portion of the aperture 16. The trough is defined by a bottom wall 32 which is the vehicle upper deck drain and upright flanges 28, 30 at each transverse end thereof. The flanges 28, 30 extend from the vehicle quarter panels 22, 24. The junctures of the flanges 28, 30 with the quarter panels 22, 24 define the upper end edges 18, 20 of the through 26. The rear deck filler panel 10 is mounted in the trough 26.

The rear deck filler panel 10 is generally U-shaped in transverse cross-section and includes an elongated upper panel portion 34 for extending between the quarter panels 22, 24 with a flange 36, 38 extending downwardly along each elongated side edge of the upper panel portion 34.

Figure 2:
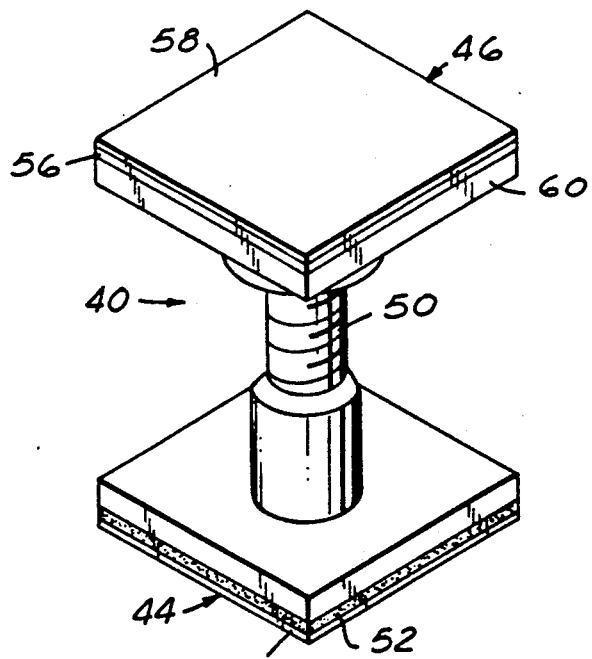
FIG. 2 is a view in perspective of the adjustable support member used in connection with mounting the rear deck filler panel.
Figure 3:
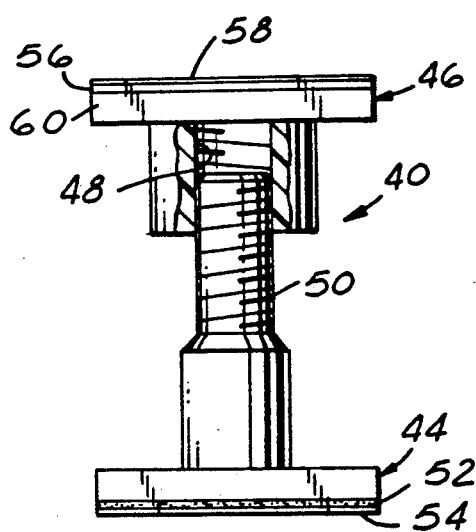
FIG. 3 is an elevational view of the adjustable support member with portions broken away for the purpose of clarity.

An adjustable support member 40, 42 is positioned on the trough bottom wall 32 closely adjacent each upright flange 28, 30. As shown in FIGS. 2 and 3, each adjustable support member 40, 42, illustratively member 40, includes a base element 44 and a panel support element 46. The periphery of the panel support element 46 is defined by an interconnected series of straight edges 60. Preferably, the panel support element 46 is square, as shown. One of the base element 44 and the panel support element 46 has a threaded opening therein. Preferably, a threaded opening 48 is provided in the panel support element 46 as shown. The other of the base element 44 and the panel support element 46 has a threaded member extending therefrom. Preferably, a threaded member 50 extends from the base element 44 as shown. The member 50 is threadingly received in the opening 48. The adjustable support members may be fabricated of a material such as nylon by the injection molding process.

As will be noted in FIGS. 1 and 2, a layer of adhesive 52 covered by a layer of cellophane 54 is provided on the underside of each base element 44. The adhesive may be, for example, an acrylic of the type which does not cure to a hardened state. The cellophane 54 is removed prior to positionment of the adjustable support member in the trough 26 as will be later described. The panel support element 46 is also provided with a layer of adhesive 56 on the upper surface thereof with a layer of cellophane 58 laid thereover. The cellophane 58 has a slippery surface as is well-known. This feature is made use of in the present invention.

Figure 4:
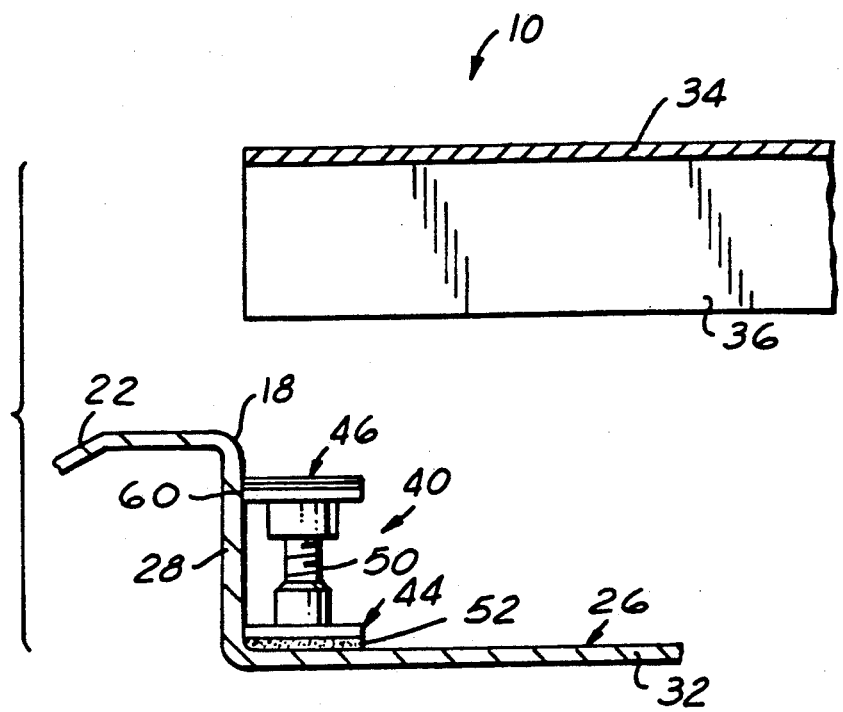
FIG. 4 is sectional view taken substantially along the line 4—4 of FIG. 1 looking in the direction of the arrows.
Figure 5:
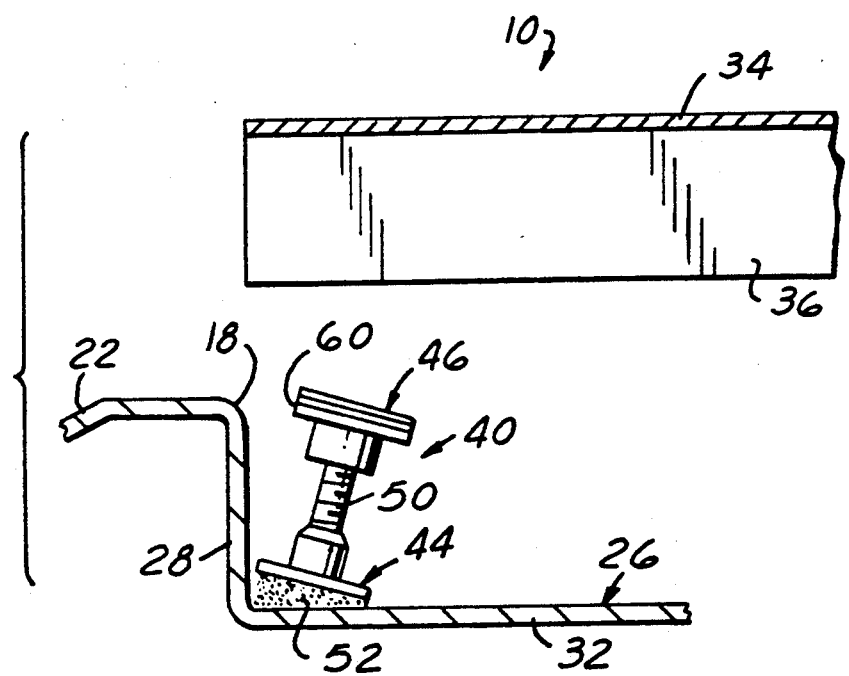
FIG. 5 is a view similar to FIG. 4 illustrating the technique for adjusting the adjustable support member after it has been installed.
Figure 6:
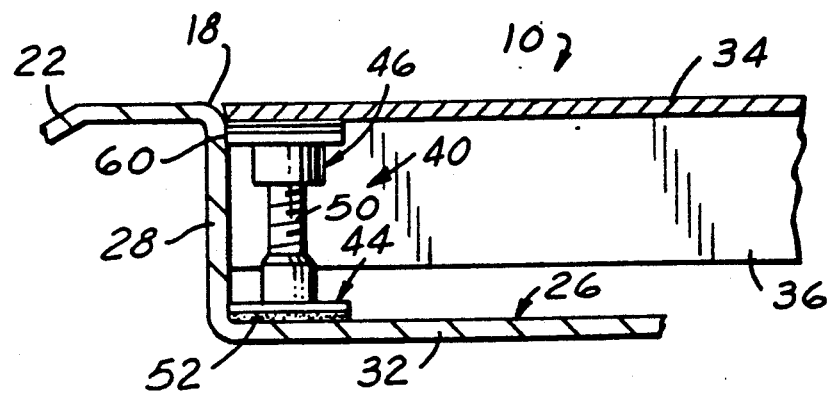
FIG. 6 is a sectional view illustrating the completed assembly.

Reference is now made to FIGS. 4, 5 and 6 which illustrate the method for installing the mounting structure. As shown in FIG. 4, adjustable support members, illustratively member 40, are placed in an upright position in the trough 26 closely adjacent to one of the upright flanges, illustratively flange 28, of the trough 26 with the base element 44 in adherent contact with the trough bottom wall 32 (the layer of cellophane 54 having been first removed). The adjustable support members 40, 42 are so positioned that one of the straight edges 60 of the panel support element 46 is close enough to the adjacent upright flange 28, 30 to impinge thereon upon attempted rotation of the panel support element to thereby prevent such rotation. The edge 60 is illustrated in abutting relationship with the flange 28. This is the most desirable position. However, in some cases it will not be possible to achieve abutment but it is sufficient if the edge 60 is very close to the flange 28.

As will be noted in FIG. 4, the upper surface of the panel support element 46 is located beneath the upper end edge 18 of the trough 26. This relationship is unacceptable as it will result in a misaligned rear deck filler panel 10. As shown in FIG. 5, the adjustable support member 40 is consequently tilted to the right at an angle of approximately 15 to 20 degrees away from the adjacent upright flange 28. This is done by applying sufficient manual force to overcome the adhesive contact of the base element 44 with the trough bottom wall 32. The adhesive 52, being elastic, stretches to accommodate such tilting. The angle of the tilt is sufficient to permit rotation of the panel support element 46 without impinging against the flange 28. The difference between the level of the upper surface of the panel support element 46 and the aperture edge 18 is noted before tilting the member 40. The panel support element 46 is then rotated to cause threading of the threaded member 50 out of the threaded opening 48 as necessary to adjust the height of the panel support element upper surface 47 so that the upper surface 47 of the panel support element will be substantially flush with the edge 18. The adjustable support member 40 is then returned to its upright position. If the panel support element 46 had been slightly too high rather than too low as shown in FIG. 4, the element 46 would have been threaded downwardly instead of upwardly as in the illustrative case. It is not necessary that the upper panel portion 34 be in exact alignment with the edge 18. It may be up or down a small amount. Before placing the rear deck filler panel in place as shown in FIG. 6, the other adjustable support member 42 is also adjusted by repeating the above described steps. The rear deck filler panel 10 is then placed in the trough 26 as illustrated in FIG. 6 to complete the mounting structure. Subsequently, as is conventional, the rear deck filler panel 10 is secured in place by means of threaded fasteners which extend through openings 62 of flange 38 into connection with vehicle bracket structure (not shown).

In operation of the vehicle 12, the layer of adhesive 52 on the panel support element 46 functions as a pad to absorb vibratory forces of the panel portion 34. The slippery surface of the cellophane 54, which remains in place, facilitates relative sliding movement between the panel support element 46 and lower surface of the upper panel portion 34. This is particularly useful when mounting the filler panel in the trough 26.

I claim:

1. The method of mounting a rear deck filler panel on a vehicle in a trough provided between a rear window and a trunk lid opening and extending across the width of the vehicle between vehicle quarter panels, the trough including a bottom wall and upright flanges at each transverse end thereof, junctures of the upright flanges with the vehicle quarter panels defining upper end edges of the trough, the rear deck filler panel being generally U-shaped in transverse cross-section and including an elongated upper panel portion for extending between the quarter panels with a flange extending downwardly along each elongated side edge of the upper panel portion, the method comprising the steps of:

a) providing an adjustable support member including a base element and a panel support element with one of the base element and the panel support element having a threaded opening and the other of these elements having a threaded member extending therefrom into threaded engagement with the threaded opening, the base element having a layer of adhesive on the underside thereof, and the periphery of the panel support element being defined by an interconnected series of straight edges;

b) placing an adjustable support member in an upright position in the trough closely adjacent to one of the upright flanges of the trough with the base element in adherent contact with the trough bottom wall and one of the straight edges of the panel support element being close enough to the adjacent upright flange to impinge thereon upon attempted rotation of the panel support element to thereby prevent such rotation;

c) comparing the height of the adjustable support member with the height of the adjacent upper end edge of the trough and noting the amount of any difference therebetween;

d) tilting the adjustable support member away from the adjacent upright flange, by applying sufficient manual force to overcome the adhesive contact of the base element with the trough bottom wall, a distance sufficient to permit rotation of the panel support element;

e) rotating the panel support element to cause threading of the threaded member into or out of the threaded opening as necessary to adjust the height of the panel support element so that the upper surface of the panel support element will be substantially flush with the adjacent upper end edge of the trough;

f) returning the adjustable support member to its upright position;

g) repeating steps b-f with a second adjustable support member adjacent to the other upright flange;

h) and then placing the rear deck filler panel in the trough with the elongated upper panel portion resting on the panel support elements of the adjustable support members.

2. The method of claim 1, wherein the adjustable support elements are tilted about fifteen to twenty degrees away from the upright flanges to facilitate rotation of the panel support elements.

* * * * *